US008240619B2

(12) United States Patent
Nikayin

(10) Patent No.: US 8,240,619 B2
(45) Date of Patent: Aug. 14, 2012

(54) CABLE BRACKET

(75) Inventor: David Nikayin, Los Angeles, CA (US)

(73) Assignee: Orbit Industries, Inc., Los Angeles, CA (US)

(*) Notice: Subject to any disclaimer, the term of this patent is extended or adjusted under 35 U.S.C. 154(b) by 216 days.

(21) Appl. No.: 12/466,671

(22) Filed: May 15, 2009

(65) Prior Publication Data

US 2009/0283645 A1  Nov. 19, 2009

Related U.S. Application Data

(60) Provisional application No. 61/053,643, filed on May 15, 2008.

(51) Int. Cl.
*F16L 3/22* (2006.01)
*F16L 3/00* (2006.01)
(52) U.S. Cl. ......................... 248/68.1; 248/58
(58) Field of Classification Search .......... 248/49, 248/58, 62, 63, 68.1, 74.1
See application file for complete search history.

(56) References Cited

U.S. PATENT DOCUMENTS

| 2,972,461 | A | * | 2/1961 | Balbach et al. | 248/68.1 |
| 5,961,081 | A | * | 10/1999 | Rinderer | 248/68.1 |
| 6,398,170 | B1 | * | 6/2002 | Wada | 248/74.5 |
| 6,460,813 | B1 | * | 10/2002 | Gretz | 248/62 |
| 6,565,048 | B1 | * | 5/2003 | Meyer | 248/58 |
| 2003/0102412 | A1 | * | 6/2003 | Miescher | 248/62 |
| 2005/0211853 | A1 | * | 9/2005 | Whorton | 248/71 |

FOREIGN PATENT DOCUMENTS

| EP | 556572 A1 | * | 8/1993 |
| WO | WO 9005400 A1 | * | 5/1990 |

* cited by examiner

*Primary Examiner* — Terrell McKinnon
*Assistant Examiner* — Chiedu Chibogu
(74) *Attorney, Agent, or Firm* — Paul J. Backofen, Esq.; Crockett & Crockett, PC

(57) ABSTRACT

A cable bracket may be stamped from sheet material and folded to form a generally rectangular cable bracket suitable for attachment to, or within a wall or other construction space. The cable bracket may releasable secure multiple cables and or conduits. Two or more spring elements may be formed in the bracket to control and secure the cables within the bracket. A cable bracket may be secured to a metal, wood or concrete building element using any suitable fastener such as screws, nails, rivets and or bolts.

2 Claims, 5 Drawing Sheets

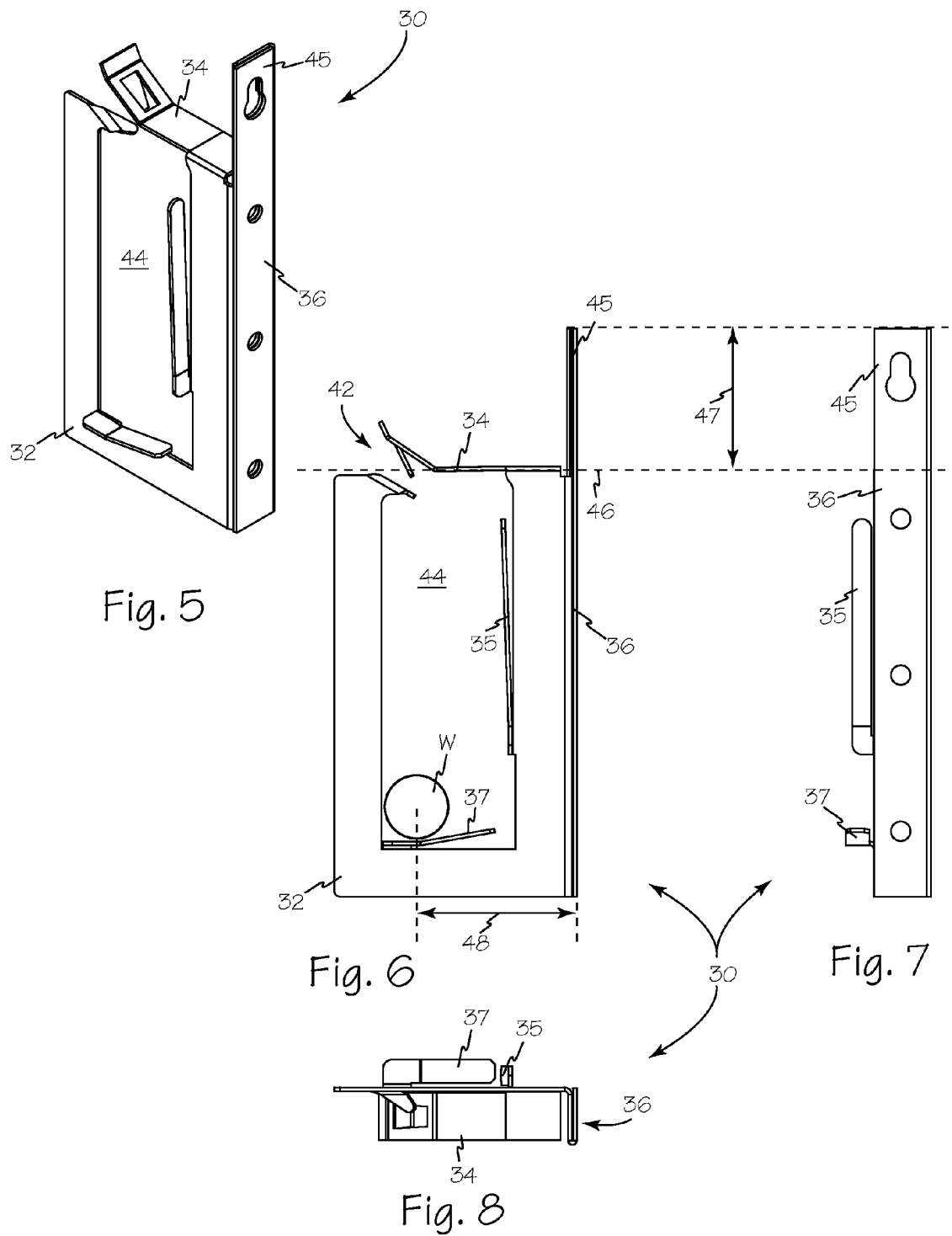

CABLE BRACKET

RELATED APPLICATIONS

This application claims priority from copending U.S. Provisional patent application 61/053,643 Filed May 15, 2008.

FIELD OF THE INVENTIONS

The inventions described below relates to the field of electrical construction components and more specifically to cable brackets for securing electrical cables to structural components.

BACKGROUND OF THE INVENTION

Conventional wood frame construction techniques are often adapted to metal frame construction. The technique of nailing or otherwise fixing electrical cables to a wooden structural member such as a stud does not translate well to metal frame construction.

SUMMARY

A cable bracket may be stamped from sheet material and folded to form a generally rectangular cable bracket suitable for attachment to, or within a wall or other construction space. The cable bracket may releasable secure multiple cables and or conduits. Two or more spring elements may be formed in the bracket to control and secure the cables within the bracket. A cable bracket may be secured to a metal, wood or concrete building element using any suitable fastener such as screws, nails, rivets and or bolts or removable.

Cable brackets may also be secured together in a variety of configurations to enable support of multiple cable bundles.

BRIEF DESCRIPTION OF THE DRAWINGS

FIG. 5 is an isometric view of a cable bracket.
FIG. 6 is a side view of a cable bracket of FIG. 5.
FIG. 7 is an end view of the cable bracket of FIG. 5.
FIG. 8 is a top view of the cable bracket of FIG. 5.

DETAILED DESCRIPTION OF THE INVENTION

Figure 1:
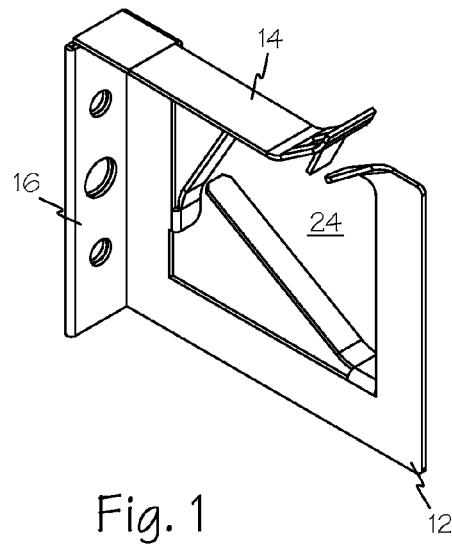
FIG. 1 is an isometric view of a cable bracket.
Figure 2:
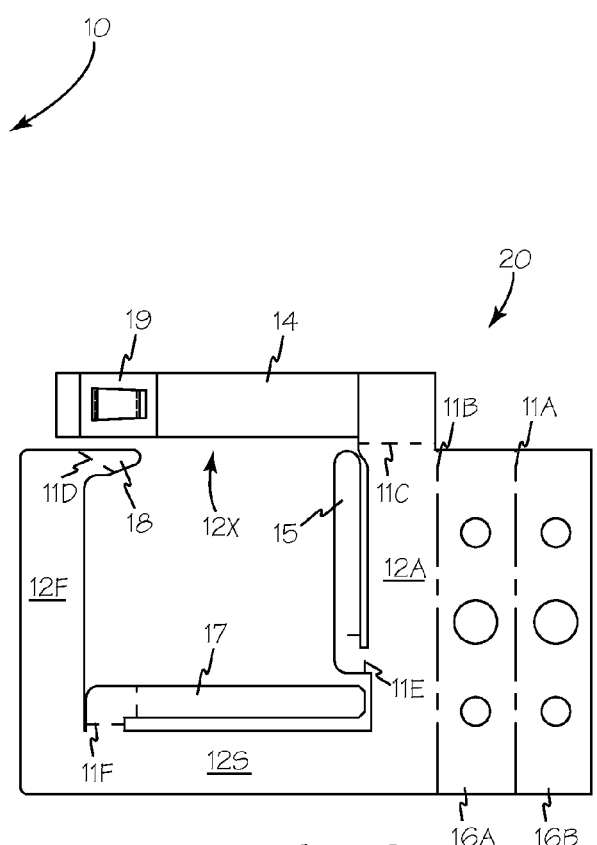
FIG. 2 is a side view of a cable bracket blank.
Figure 3:
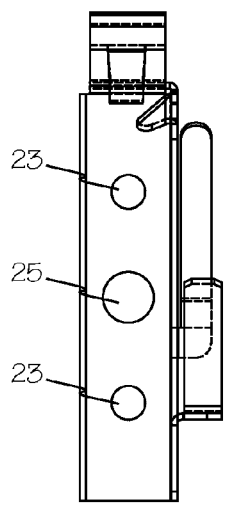
FIG. 3 is an end view of the cable bracket of FIG. 1.
Figure 4:
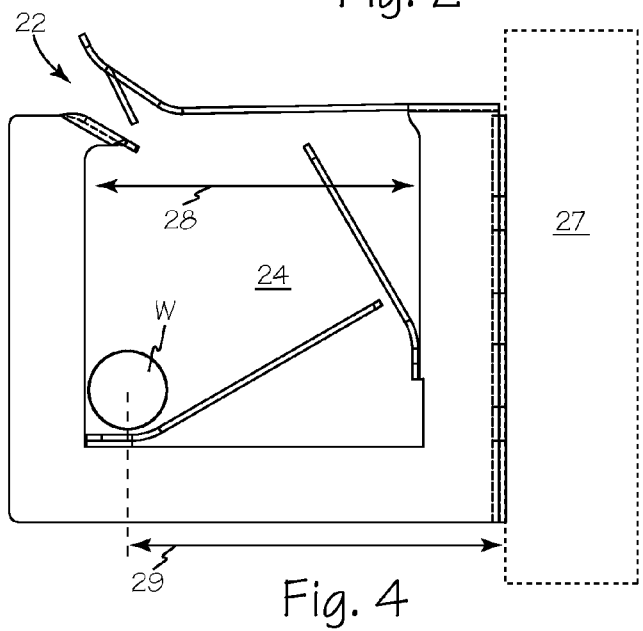
FIG. 4 is a side view of the cable bracket of FIG. 1.

Cable bracket 10 of FIGS. 1-4 is formed from a generally planar bracket blank such as bracket blank 20 of FIG. 2. Cable bracket 10 includes a generally c-shaped bracket frame 12 which is formed of an attachment leg 12A, a support leg 12S, a free leg 12F and an open side 12X. Attachment leg 12A is secured to attachment flange 16 along fold line 11A with top arm 14 included to extend from attachment leg 12A to free leg 12F to enclose and secure cable space 24. Latch 19 and latch tab 18 may be removably engaged to secure top arm 14 to free leg 12F and thus secure any cables within cable space 24.

Attachment flange 16 is formed by parallel folding attachment segments 16A and 16B along line 11A and then folding attachment flange 16 along line 11B to be perpendicular to bracket frame 12 as shown in FIG. 1. Top arm 14 is folded to be perpendicular to bracket frame 12 along line 11C. Latch tab 18, first spring arm 15 and second spring arm 17 are folded along lines 11D, 11E and 11F respectively to be perpendicular to bracket frame 12.

Spring arms 15 and 17 may be included to control the location of cables within cable space 24 and to minimize abrasion of cables on the exposed edges of the bracket frame. Spring arms may have any suitable location and orientation including on free arm 12F.

Holes in attachment flange 16 such as holes 23 and hole 25 are used to engage cable bracket 10 to any suitable member such as wood stud 27. Width 28 of cable space 24 may be adjusted to change the rotational moment generated by weight W and moment arm 29. A minimal moment bracket is illustrated in FIGS. 5-8

Cable bracket 30 of FIGS. 5-8 is formed from a generally planar bracket blank as discussed above. Cable bracket 30 includes bracket frame 32 attached to attachment flange 36 and top arm 34 to enclose and secure cable space 44. Latch 39 and latch tab 38 may be removably engaged to secure any cables within cable space 44.

Attachment flange 36 is formed as discussed above and includes extension tab 45 which extends beyond plane 46 which includes top arm 34. Extension tab 45 is used to secure cable bracket 30 to any suitable structural component or an attachment apparatus such as a clamp which is secured to a structural component such as a wall, ceiling, roof, pipe, frame or beam element. Length 47 of extension tab 45 may be selected to optimize the resistance to the rotational moment resulting from the expected weight W supported in cable space 44 and the moment arm 48.

Figure 9:
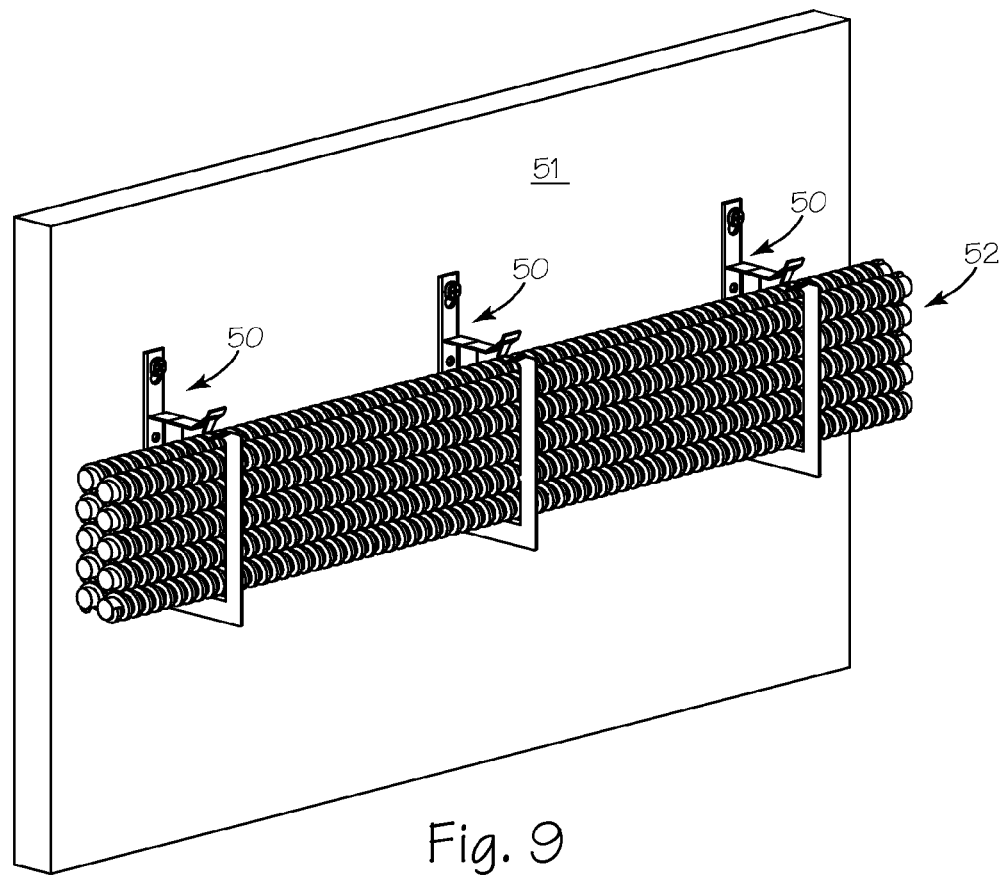
FIG. 9 is an isometric view of multiple cable brackets of FIG. 5 secured to a wall.
Figure 10:
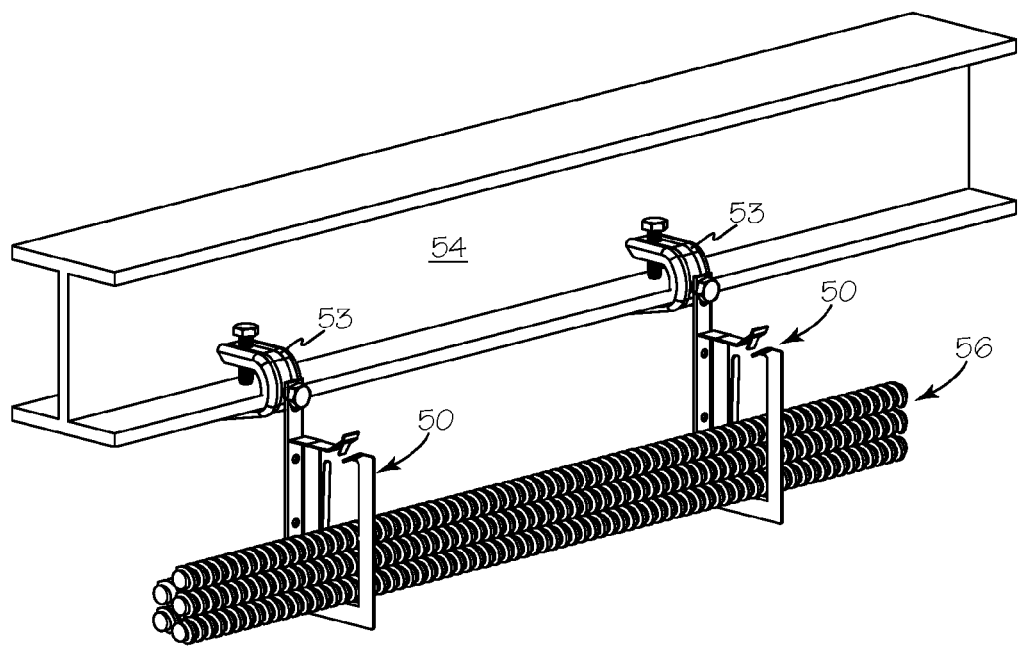
FIG. 10 is an isometric view of multiple cable brackets of FIG. 5 secured to clamps attached to a structural element.

Referring now to FIG. 9 cable brackets 50 are attached to wall 51 to support cable bundle 52. In an alternate configuration shown in FIG. 10, each cable bracket 50 is attached to clamp 53 which are in turn secured to beam 54 to support cable bundle 56.

Figure 11:
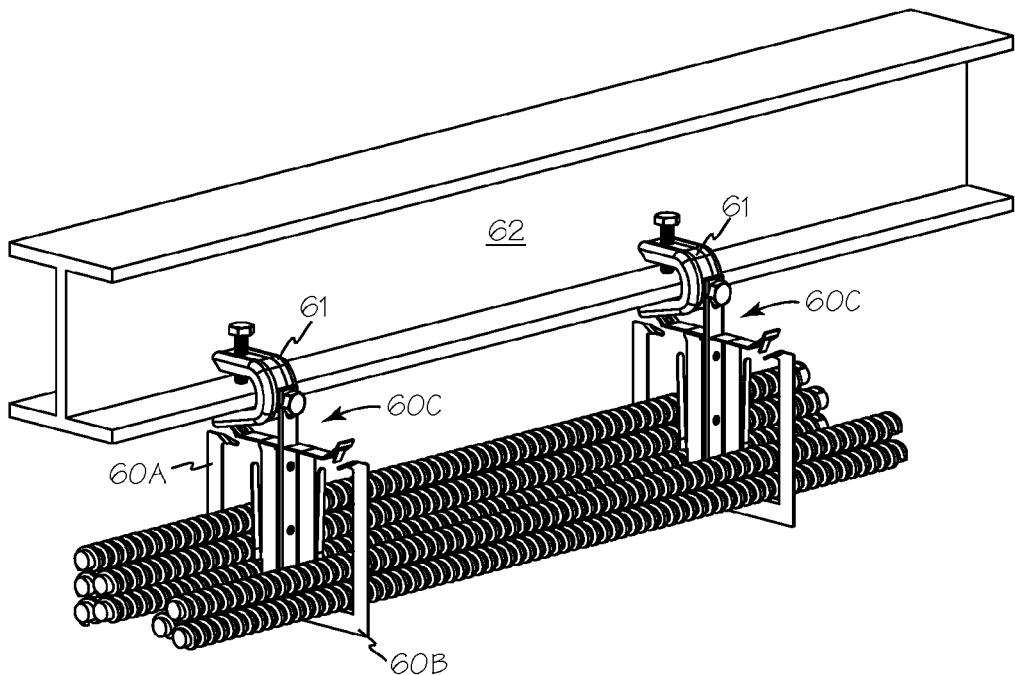
FIG. 11 is an isometric view of back-to-back combination cable brackets secured to clamps attached to a structural element.

Referring to FIG. 11, multiple cable brackets may be combined to form composite or combination devices such as combining cable brackets 60A and 60B which are secured to form a back-to-back combination cable bracket 60C which may be secured to clamp 61 which is attached to a structural element 62.

Figure 12:
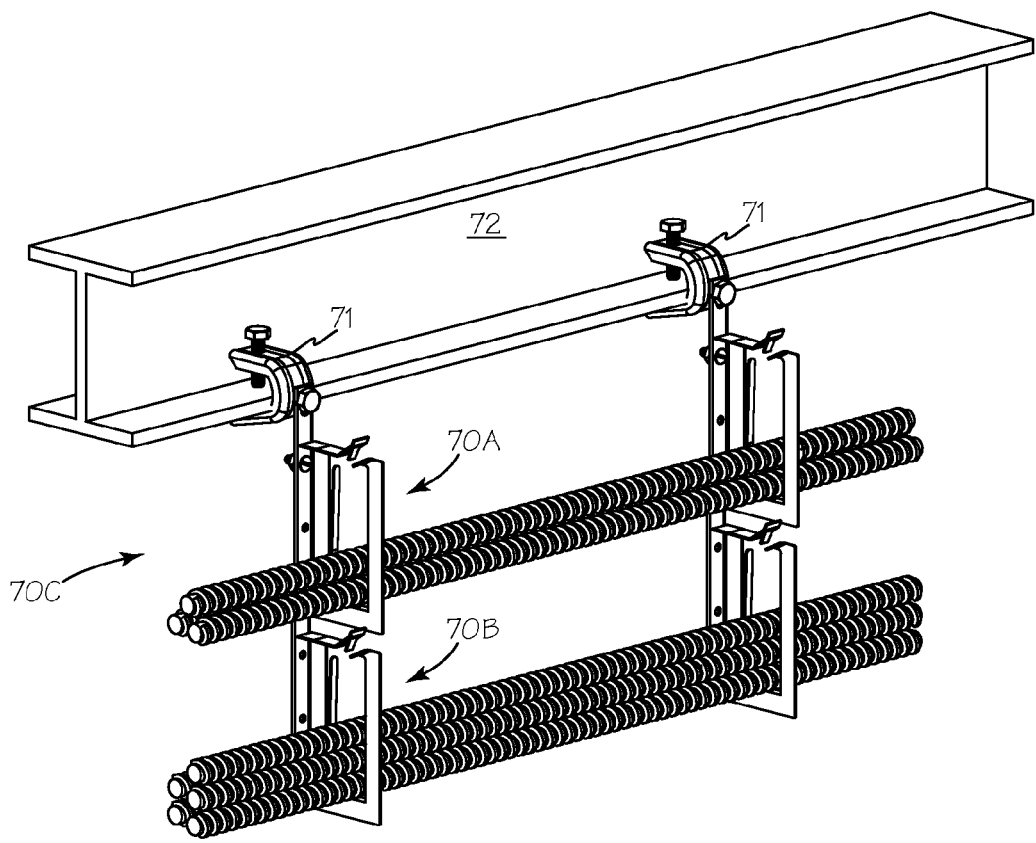
FIG. 12 is an isometric view of a stacked back-to-back combination of cable brackets secured to clamps attached to a structural element.

Referring to FIG. 12, cable brackets 70A and 70B are secured to form a stacked combination cable bracket 70C which may be secured to clamp 71 which is attached to a structural element 72.

Figure 13:
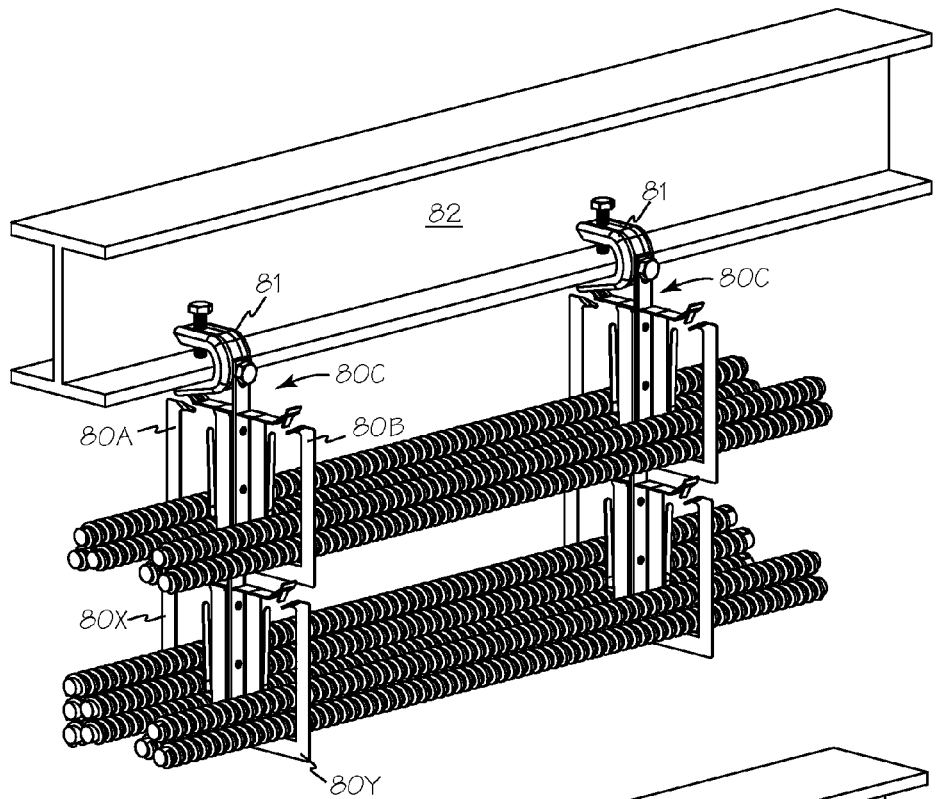
FIG. 13 is an isometric view of a stacked combination of cable brackets secured to clamps attached to a structural element.

Referring to FIG. 13, cable brackets 80A, 80B, 80X and 80Y are secured to form a stacked back-to-back combination cable bracket 80C which may be secured to clamp 81 which is attached to a structural element 82.

Figure 14:
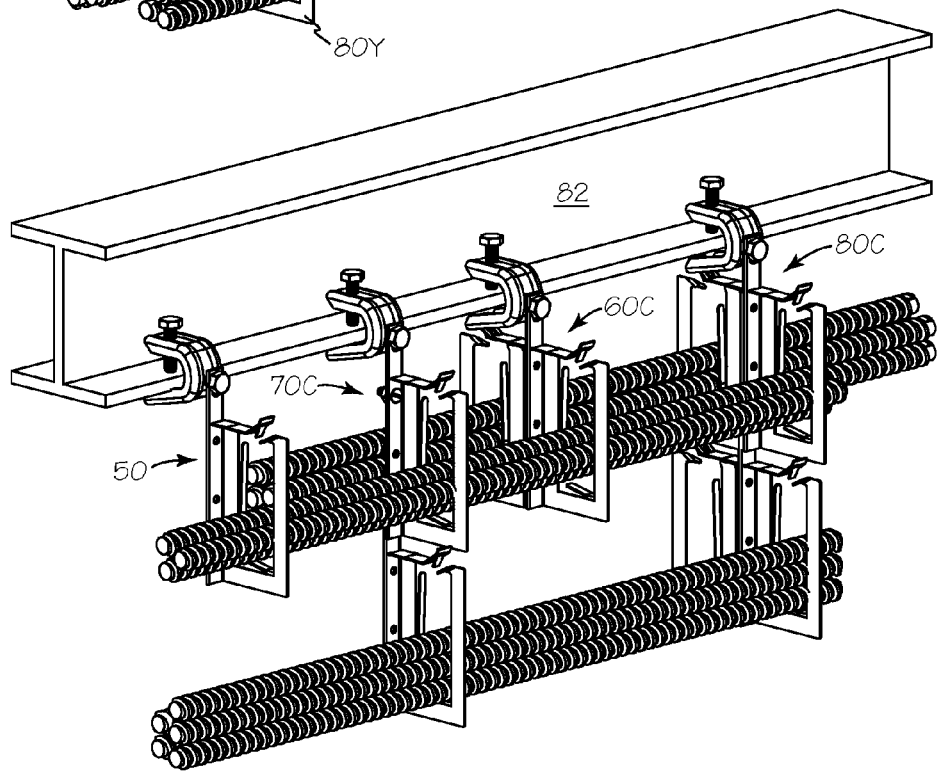
FIG. 14 is an isometric view of single and combination cable brackets secured to clamps attached to a structural element.

Referring now to FIG. 14, various cable routing configurations may be accommodated by using various combinations of cable brackets such as cable bracket 50 and combination cable brackets such as cable brackets 60C, 70C and 80C as illustrated.

While the preferred embodiments of the devices and methods have been described in reference to the environment in which they were developed, they are merely illustrative of the principles of the inventions. Other embodiments and configurations may be devised without departing from the spirit of the inventions and the scope of the appended claims.

I claim:

1. A device for supporting cables comprising:
a generally planar piece of metal stock cut to form a generally planar c-shaped bracket frame having an attachment leg, a support leg extending from the attachment leg, a free leg extending from the support leg, and an open side, the free leg having an unconnected distal end;
an attachment flange folded along a parallel fold line from the attachment leg, the attachment flange is folded such that the attachment flange is perpendicular to the generally planar c-shaped bracket frame, wherein the attachment flange is configured for supporting the generally planar c-shaped bracket frame on a support surface;
a first spring arm folded into a plane perpendicular to the attachment leg and extending from the attachment leg and inclined to urge any supported cable toward the free leg;
a first spring arm folded into a plane perpendicular to the support leg and extending from the support leg and inclined to urge any supported cable toward the open side;
a latch tab folded into a plane perpendicular to the free leg and extending from the distal end of the free leg; and
a top arm secured to the attachment leg and extending from the attachment leg across the open side and operable to removably engage the latch tab on the free leg and enclose a cable space.

2. The device of claim 1, wherein the attachment flange includes an extension tab, and the extension tab is extending from the attachment flange beyond a perpendicular plane that includes the top arm.

* * * * *